United States Patent Office 3,419,899
Patented Dec. 31, 1968

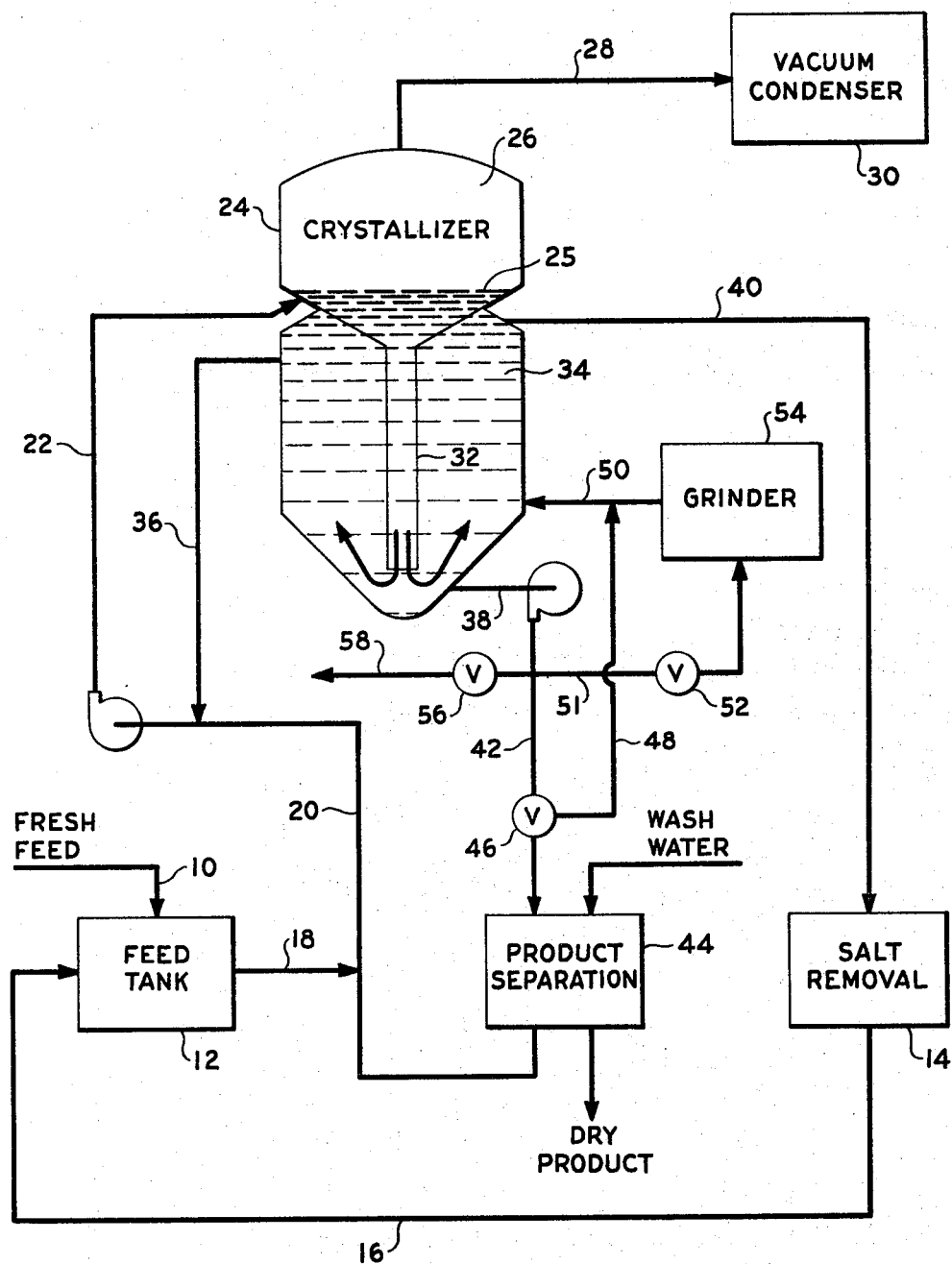

3,419,899
CRYSTALLIZATION OF AMMONIUM
PERCHLORATE
Lewis E. Tufts, Lewiston, and Donald L. Eichler, Buffalo, N.Y., assignors to Hooker Chemical Corporation, Niagara Falls, N.Y., a corporation of New York
Filed Apr. 16, 1965, Ser. No. 448,710
8 Claims. (Cl. 23—302)

This invention relates to an improved process for crystallizing ammonium perchlorate, and more particularly, to an improved process for crystallizing ammonium perchlorate of good crystal structure, low moisture content, and of a quality particularly suited for rocket propellant use.

Ammonium perchlorate is used as an ingredient in explosives, in pyrotechnic compositions, as a raw material for the production of perchloric acid and numerous metallic perchlorates, such as magnesium perchlorate. By far, the most predominant use for ammonium perchlorate is as an ingredient in propellant compositions for solid fuel rockets. For this latter use, it is necessary that the ammonium perchlorate meet rigid requirements for chemical purity and physical properties.

The art of crystallizing ammonium perchlorate has developed over years of experience to a point where ammonium perchlorate suitable for most uses is obtained by continuous crystallization from aqueous solutions in the temperature range of about 25 to 45 degrees centigrade. However, ammonium perchlorate has a strong tendency to form discontinuities in the crystal structure, thereby resulting in voids within the crystals. These voids effect an undesirable reduction in both the strength and density of the crystal. In addition, the voids are believed to change the burning rate of rocket motor compositions in comparison with similar size particles having a lesser number and smaller volume of voids. The voids are also disadvantageous because they enclose mother liquor which is not removed by washing and drying operations. Such occluded mother liquor causes an undesirable increase in moisture content and is a source of contamination with other constituents of the mother liquor. Because ammonium perchlorate used in rocket propellant compositions is preferably of low moisture content, crystallization techniques which result in large amounts of included moisture are unsatisfactory.

Moisture included within the crystal during crystallization is not readily removed by a drying operation, although such operations are commonly used to remove surface moisture before placing the product in storage. In storage, the included moisture slowly diffuses to the surface of the crystals where it evaporates. Unless care is exercised to see that this evaporated moisture is prevented from accumulating in the air spaces between the crystals, the relative humidity builds up until the crystals fuse and agglomerate, forming undesirable cakes. If adequate precautions are taken to prevent caking, the diffusion process will slowly remove much of the included moisture from the product. By such means, low moisture ammonium perchlorate of normal size was previously obtained in a quality suitable for rocket propellant use.

It has been found that, in the crystallization of ammonium perchlorate, the quality of the crystals is determined to a large extent on the ability of maintaining metastable conditions in the crystallizer whereby steady crystal growth is attained. Such steady state conditions are particularly difficult to attain under continuous crystallization conditions due to the fluctuations in the supersaturation of the crystallization liquor.

Conventional crystallization techniques for ammonium perchlorate blend fresh ammonium perchlorate feed with the supersaturated liquors in the crystallization zone. Surface evaporation of water in the crystallizer zone reestablishes a supersaturation condition of ammonium perchlorate in crystallization zone liquors. The supersaturation of the blended liquors is at least partially relieved by deposit of solid ammonium perchlorate on growing crystals suspended in the crystallizer. The rate of solids deposition per unit of crystal surface increases rapidly with increased supersaturation, while the removal of product crystals from the crystallization zone decreases the total crystal surface available for growth.

If the feed rate and other controlling conditions are held constant, the supersaturation will rise to force the same rate of total solids deposition to occur on the reduced total crystal surface area. Continued withdrawal of product crystals forces the supersaturation to continue to rise to a level where spontaneous nucleation occurs, generating new seed. This spontaneously generated seed replaces the crystals withdrawn as product and maintains the required crystal surface for solids deposition.

Once the supersaturation has increased to a level which yields a significant rate of spontaneous seed generation, attempts to further increase the supersaturation do not result in significantly increased crystal growth rates. Instead, the rate of spontaneous seed generation is very greatly increased. This greatly increases the crystal surface available for growth, causing a reduction in the supersaturation level below the level at which spontaneous seed generation occurs.

If no supplemental supply of seed is available, continued withdrawal of product crystals from a continuously operating crystallizer will force the supersaturation to rise to a level at which spontaneous seed generation will replace the product crystals. Since only a slight further increase of supersaturation causes a greatly increased rate of seed generation, it is not uncommon for the rate of spontaneous seed generation to vary greatly in crystallizers where every attempt is made to obtain the most stable possible operation. This is particularly true in ammonium perchlorate crystallizer operations.

Periods of excessively high rates of spontaneous seed generation are commonly called "seed showers." It is well recognized in the art that such seed showers result in drastic, and often undesirable reductions in the crystal size of the product. Since crystal size distribution of ammonium perchlorate for rocket use is narrowly specified, it is important to be able to control both the crystal size distribution and the quality of crystals in the crystallization zone. "Seed showers," with the attendant effects on particle size distribution and the related effect on crystal quality, are therefore, very undesirable.

To minimize the effects of seed showers, it is common practice to equip continuous crystallizers for ammonium perchlorate production with means for classifying, withdrawing, and redissolving excess amounts of small particle size crystals produced during seed showers. Such means, commonly called "fines dissolvers," appreciably reduce the undesirable effects of seed showers, but do little to prevent their occurrence. It is therefore, common for the rate of spontaneous seed generation to be subject to considerable variation. This variation may even take the form of fairly regular fluctuations, with accompanying fluctuations in the size distribution and quality of the product crystals.

As a result of previous difficulties in controlling the supersaturation conditions in the crystallization zone, and the strong tendency for ammonium perchlorate to form discontinuities in the crystal structure, there has long been a need for a process for directly controlling the level of supersaturation of the crystallizer liquor, thereby obtaining low moisture, high quality ammonium perchlorate crystals particularly suited for rocket propellant use.

It is an object of this invention to provide a process for producing ammonium perchlorate with reduced moisture and void content at practical rates in conventional crystallizing equipment. Another object of this invention is to provide a process for controlling and holding constant the particle size distribution in the crystallization zone of the crystallizer. These and other objects will become apparent to those skilled in the art from the description of the invention which follows.

In accordance with this invention, a process is provided for producing low moisture, high quality ammonium perchlorate crystals, comprising feeding to a crystallization zone, an aqueous solution containing ammonium perchlorate, maintaining an evaporating zone within said crystallization zone for subatmospheric removal of water, concentrating said ammonium perchlorate solution in said evaporating zone to a supersaturated condition by evaporating water, crystallizing ammonium perchlorate while maintaining said supersaturated condition at a level below that at which spontaneous seed generation occurs by feeding to said supersaturated slurry seeding particles of ammonium perchlorate, wherein said seeding particles are obtained by reducing the particle size of ammonium perchlorate crystals to a finely divided state, and wherein said seeding is at a rate proportional to the rate of withdrawal of crystalline product, and removing from said crystallization zone crystalline ammonium perchlorate product.

Under steady state conditions in a continuous crystallizer, new seed particles are best supplied at a rate sufficient to replace those removed as product crystals. The seeding rate is maintained at a level corresponding to the removed product crystals and the seed size distribution is maintained in a range whereby the seeding rate and size maintain the supersaturation level in the crystallizer below that at which spontaneous seed generation will occur. The present invention thus provides a means for controlling the supersaturation at a low level while supplying the seeding requirements to the slurry in the crystallizer.

By the process of this invention, it is now possible to maintain satisfactory uniformity of the crystal size distribution within the crystallization zone, particularly in commercial size evaporative crystallizers, while producing high quality ammonium perchlorate crystals of low moisture and low void content.

The benefits of the present invention result from controlling the supersaturation in the crystallization zone at a level below that at which spontaneous seed generation occurs. Such control of the supersaturation is accomplished by utilization of the increased solubility of very small ammonium perchlorate particles over particles of considerably larger diameter. Hence, an ammonium perchlorate solution saturated with respect to crystals of a given diameter will be slightly supersaturated with respect to crystals of twice the given diameter and slightly below saturation with respect to crystals of half the given diameter. Smaller crystals therefore, tend to dissolve, building up a supersaturation with respect to larger crystals. This supersaturation is relieved by deposition of solids on the larger crystals.

The differences in solubility of ammonium perchlorate are small within the range of product sized crystals, such as those averaging 200 microns diameter. However, solubility differences are more pronounced within the size range from submicron diameters up to about 50 micron diameter. Submicron particles of about 0.01 to 1 micron diameter will dissolve quite readily in a solution saturated with respect to product sized crystals. Therefore, unless there is considerable supersaturation in the crystallization zone of a continuous crystallizer, finely divided ammonium perchlorate particles added to furnish seed will dissolve instead. As the supersaturation in the crystallization zone approaches the level required for spontaneous seed generation, even the very small particles do not dissolve, but remain to serve as seed. Thus, for any given degree of supersaturation in a crystallization zone, there is a particular particle diameter above which ammonium perchlorate particles will serve as seed, and below which the particles will dissolve.

By feeding finely divided ground ammonium perchlorate with a wide particle size distribution containing a predominance by number of very fine particles, the supersaturation in a crystallization zone is prevented from rising to a level where spontaneous seed generation can occur. The supersaturation will rise only to a level where a sufficiency of seed will be furnished by the larger particles of the finely divided ammonium perchlorate. Under normal crystallization conditions, the finer particles dissolve. However, these finer particles constitute a reservoir of seed which will become effective upon a change in operating conditions which calls for more seed.

The invention will be further described by references to the drawing which is a partial schematic diagram and flow sheet illustrating the process of the present invention.

The process is effected by feeding a source of ammonium perchlorate via line 10 to feed tank 12. The ammonium perchlorate source can be wet cake, e.g., undried ammonium perchlorate crystals or, as is normally the case, a solution of the reaction mixture obtained by reacting an alkali metal perchlorate with ammonium chloride or with ammonia and carbon dioxide. Thus, the feed material can be a relatively pure ammonium perchlorate which is substantially free of salt, or an ammonium perchlorate feed stream containing impurities such as ammonium or alkali metal chloride, perchlorate, carbonate or bicarbonate. An ammonium perchlorate feed containing impurities is the normal feed material.

In feed tank 12, the feed material is heated and mixed with mother liquor from salt removal means 14, delivered via line 16 to the feed tank. In addition, sufficient water is added so as to provide an ammonium perchlorate containing solution which is heated to a temperature above its saturation point. The prepared ammonium perchlorate containing solution is passed via lines 18, 20 and 22 to crystallizer 24, at a temperature of about 30 to 110 degrees centigrade, and containing about 10 to about 50 percent ammonium perchlorate by weight, such temperature and concentration preferably providing an ammonium perchlorate solution at less than saturation so as to be substantially free of undissolved ammonium perchlorate.

Crystallizer 24 is a conventional evaporative crystallizer which provides an area wherein the liquid within the crystallizer is subjected to an evaporative cooling. Such evaporative cooling is normally effected by subjecting liquid surface 25 to subatmospheric pressure through the action of the vapor removal means of vapor space 26, conduit 28 and vacuum condenser 30. Water is removed from crystallizer 24 at a rate sufficient to cool the liquor to a temperature of about 20 to 90 and preferably to a normal crystallization temperature of 25 to 45 degrees centigrade. Sufficient water is removed to cool and concentrate the liquor to a supersaturated condition.

Supersaturated liquor developed by evaporation at liquid surface 25 is passed via funnel 32 to lower crystallizer zone 34 wherein crystal growth occurs. As crystal growth occurs, a slurry is formed in the crystallizer wherein the solids content of the slurry ranges from about 20 to 60 percent by volume and preferably between about 30 and 45 percent by volume. The term "solid content" means the level to which solids, in a sample withdrawn from the crystallizer, will settle, when placed in a graduated cylinder. Thus, if a 1000 milliliter sample is withdrawn from the crystallizer and placed in a 1000 milliliter graduated cylinder, and if the solids settled to a level up to the 300 milliliter mark, the solid content is considered to be 30 percent by volume.

Slurry is removed from lower crystallizer zone 34 via line 36 at a rate sufficient to provide agitation within the lower crystallization zone so as to maintain the crystallizing product in dynamic suspension. Such a flow rate corresponds to a per minute flow of about equal to the crystallizer liquid volume to about 1/20 of the crystallizer liquid volume and, more preferably, from about 1/2 to 1/10 of the crystallizer volume per minute.

Slurry withdrawn via line 38 is pumped via line 42 to product separation means 44. Valve 46 controls the flow of slurry to product separator 44 in a manner whereby the product separation means 44 can be bypassed in whole or in part and the slurry returned via lines 48 and 50 to lower crystallization zone 34. Valve 52 on line 51 controls the flow of slurry to grinder 54. Also connected to line 42 is valve 56 which provides a sampling spigot 58. Valves 46 and 52 are automatically or manually controlled.

Grinder 54 provides the means for producing seeding particles for the crystallizer. A controlled proportion of crystallizer slurry is passed through grinder 54. In grinder 54, the solid contents of the slurry are reduced to finely divided particles and returned to the crystallizer via line 50. In normal ammonium perchlorate crystallization, under normal crystallization conditions, the weight average particle size of the solids withdrawn from the crystallizer is about 200 microns, ranging from about 50 to 350 microns. Grinder 54 reduces the particle size of the solids in the withdrawn slurry to a size ranging from submicron to about 50 microns, e.g., about 0.01 to 50 microns. Preferably, the grinder produces particles in both the submicron and especially throughout the range of 0.05 to about 25 microns so as to provide both particles which will act as seed and particles which will dissolve when the supersaturation of the crystallizer liquor so warrants.

The slurry flow through grinder 54 can vary over wide limits, but is preferably in an amount wherein the solids ground equal about 0.5 to about 20 percent by weight of the product crystals removed in the product separator, the preferred range being about 1 to 15 percent solids based on the crystal product removed. Lesser flows through the grinder can be used, but the stabilization of the supersaturation within the crystallizer may not be sufficiently consistent. Greater flows can also be used, but such amounts would be in excess of that required unnecessarily increase the grinding requirements. The seeding by the grinder can be done continuously or intermittently.

Grinder 54 can conveniently be a colloid mill, a gear pump or other grinding and abrasive apparatuses useful in reducing to the desired range the particle size of solids contained in aqueous suspensions.

Although the ammonium perchlorate which is ground for seeding material is preferably fed to the grinder as a slurry from the crystallizer, other sources of ammonium perchlorate can be fed to the grinder such as the undersized and oversized particles separated in classification steps, wet cake material, product crystals, and the like.

Product separator 44 removes the solids from the slurry by conventional means such as by filtration, centrifuging, or other liquor-solids separation techniques. The separated solids are washed and dried and the mother liquor and wash water are returned to the crystallizer 24 via lines 20 and 22.

Also drawn from crystallizer 24 is a stream of mother liquor via line 40. Such a stream is withdrawn when impurities, such as the previously described salts are present in the ammonium perchlorate feed. Line 40 is preferably located so as to draw the mother liquor from a still zone within the crystallizer thereby withdrawing primarily clear liquor.

The liquor flowing through line 40 is fed to salt removal means 14 wherein the salt is removed by conventional techniques. The mother liquor from salt removal means 14 is passed via line 16 to feed tank 12 for subsequent recycle.

Also attached to lower crystallizer zone 34 is a circulation flow means such as that of line 36. The flow means withdraws liquor and/or slurry from lower crystallization zone 34 and returns the withdrawn liquor to crystallizer 24 via line 22. This circulatory flow is of a rate sufficient to maintain the growing crystals in suspension.

The following example illustrates certain preferred embodiments of the present invention. Unless otherwise indicated, all parts and percentages used herein are by weight and all temperatures in the example are in degrees centigrade unless otherwise indicated.

EXAMPLE

This example illustrates the improved process of the present invention for crystallizing ammonium perchlorate of low moisture and void content suitable for rocket propellant use compared to the previously preferred method of crystallizing ammonium perchlorate. In both instances, the crystallization techniques were adjusted to best meet the particle size distribution specification of:

| U.S. Standard Sieve Number | Cumulative Percent Retained | |
|---|---|---|
| | Maximum | Minimum |
| 40 | 4 | 0 |
| 50 | 11 | 3 |
| 70 | 43 | 13 |
| 100 | 86 | 40 |
| 140 | 98 | 85 |
| 200 | 100 | 97 | and a moisture content of 0.05 percent maximum.

Ammonium perchlorate was crystallized using the process of the present invention as illustrated in the drawing. The process was initiated by bringing the crystallization system into equilbrium, by several days of continuous operation. The continuous operation purged the crystallizer of atypic crystals developed during the start-up period.

The crystallizer was operated by circulating approximately 11,000 total parts of liquid and suspended solids in crystallizer 24 through lines 36 and 22 at a rate of about 6,000 parts per minute. This circulation maintained the crystals in the crystallization zone in suspension and assured rapid transfer of the supersaturated liquor developed at the evaporating surface 25, to the crystallization zone 34.

Fresh, clear, feed-liquor, at about 90 degrees centigrade and containing 36.5 parts of ammonium perchlorate per 100 parts of water, were fed through lines 18 and 20 at a rate of about 96 parts per minute. By adjustment of the absolute pressure in vacuum condenser 30, the boiling temperature at the liquid surface 25 was held at 45 degrees centigrade. This served to maintain the temperature in crystallization zone 34 at 45 degrees centigrade.

A continuously circulating flow of about 400 parts per minute of slurry was drawn from crystallization zone 34 through lines 38 and 42 past valve 46 and through lines 48 and 50 back into crystallization zone 34. The suspended solids in the crystallizer were checked by withdrawn samples from valve 56. Such samples were deemed representative of the crystallization zone. The solids volume was maintained in the range of 30 to 42 percent by volume by changing the rate at which slurry was delivered from valve 46 to the product separation means 44. Slurry passed to the product separation means was centrifuged to remove the solids, and the solids were washed with water and dried. The combined mother liquor and wash water were then returned to the crystallizer 24 through lines 20 and 22.

During the equilibrium adjustment and product production period of this example, valve 52 was regulated to feed slurry to grinder 54 at an average rate of 1 part of solids per minute. This rate corresponded to 9 to 12 percent based on the crystalline product removed in the product separation means.

To maintain the desired liquid level 25 in the crystallizer 24, a stream of relatively clear mother liquor of about 62 parts per minute was withdrawn through line 40 and delivered to salt removal means 14 wherein salt impurities were removed. A stream of mother liquor of about 38 parts per minute was decanted from the salt removal means and delivered through line 16 to feed tank 12.

During a 96 hour period after reaching equilibrium, 55,000 parts of dried crystals were porduced. Every eight hours during this production period, product samples were collected and analyzed for size distribution and moisture. Analysis of twelve samples collected indicated that the moisture content ranged from 0.05 to 0.07 percent by weight and averaged 0.055 percent. Crystal void content was observed to be very low. 98 percent of the crystals produced were within the particle size distribution specification. Within a week after production, the moisture content of the crystals had diffused sufficiently to meet the 0.05 percent maximum moisture specification for rocket propellant grade material. Thus, the previously required storage period was substantially eliminated in producing low moisture ammonium perchlorate while attaining better particle size distribution in the end product.

To compare these results with previous crystallizing methods, grinder 54 was disconnected and the previously preferred operating conditions were established by changing several flow rates and allowing the crystallizer several days of operation to purge the system of the previous crystals and to establish a new equilibrium.

The crystallizer was again operated at a temperature of 45 degrees centigrade utilizing a feed stream of clear ammonium perchlorate liquor at a temperature of 90 degrees centigrade. The feed rate was 120 parts per minute and the ammonium perchlorate content was 36.5 parts per 100 parts of water. The crystallizer was operated at a volume of 11,000 parts and at a circulation rate of about 6,000 parts per minute.

The rate of liquid withdrawal from the crystallizer via line 40 was 78 parts per minute and the return from salt removal means 14 to feed tank 12 was at a rate of 47 parts per minute.

During a 96 hour period of operation, 69,000 parts of ammonium perchlorate were removed in the product separation means 44. As the crystallization proceeded, crystal samples were withdrawn every 8 hours. Analysis of the twelve samples collected indicated that the moisture content of the dried crystals ranged from 0.07 to 0.12 percent by weight, averaging 0.10 percent total moisture. Of the crystals produced, 86 percent were within the particle size distribution specification.

The high moisture content of the crystals required three months of storage to sufficiently diffuse the moisture to meet the specification of 0.05 maximum moisture content for rocket use.

Microscopic comparison of the crystals produced under the two operating conditions of this example showed the voids in the material produced with the grinder in operation to be reduced by about the same degree as the included moisture.

Thus, the improved method of this invention produces an ammonium perchlorate product of lower moisture while better controlling the particle size distribution. Although the example has illustrated the production of crystals in a particular particle size distribution and at a particular temperature, the method of this invention is also applicable to operations under different conditions wherein different size particles are produced.

While there have been described various embodiments of the present invention, the methods described are not intended to be understood as limiting the scope of the invention, as it is realized that changes therein are possible. It is further intended that each element recited in any of the following claims is to be understood as referring to sults in substantially the same or equivalent the same results in substantially the same or equivalent manner. It is intended to cover the invention broadly in whatever form its principles may be utilized.

What is claimed is:

1. A process for producing low moisture, high quality ammonium perchlorate crystals comprising feeding to a crystallization zone, maintained at a temperature from about 20 degrees centigrade to about 90 degrees centigrade, an aqueous solution containing ammonium perchlorate, maintaining an evaporating zone within said crystallization zone for subatmospheric removal of water, concentrating said ammonium perchlorate solution in said evaporating zone to a supersaturated condition by evaporating water, crystallizing ammonium perchlorate while maintaining said supersaturated condition at a level below that at which spontaneous seed generation occurs by feeding to said supersaturated solution seeding particles of ammonium perchlorate wherein said seeding particles are obtained by grinding ammonium perchlorate crystals to a particle size of 0.01 to 50 microns, and wherein said seeding is at a rate proportional to the rate of withdrawal of crystalline product, and removing from said crystallization zone crystalline ammonium perchlorate product.

2. The process of claim 1 wherein the aqueous feed solution containing ammonium perchlorate contains about 10 to about 50 percent of ammonium perchlorate by weight and is at a temperature of about 30 to 110 degrees centigrade wherein said temperature and concentration corresponds to provide an ammonium perchlorate solution at less than saturation.

3. The process of claim 1 wherein the seed particles of ammonium perchlorate fed to the crystallizer range in particle size from about 0.05 to 50 microns.

4. The process of claim 1 wherein the seeding rate of seed particles fed to the crystallizer is in an amount of about 0.5 to about 20 percent by weight of the product crystals removed from the crystallizer.

5. The process of claim 1 wherein the seed particles are obtained by withdrawing a portion of solution and crystals from the crystallization zone, grinding the crystals in said solution and returning the solution and ground crystals to the crystallization zone.

6. A continuous process for producing low moisture, high quality ammonium perchlorate crystals suitable for rocket propellant use comprising feeding to a crystallization zone, maintained at a temperature from about 20 degrees centigrade to about 90 degrees centigrade, an aqueous solution containing about 10 to about 50 percent of ammonium perchlorate by weight at a temperature of about 30 to 110 degrees centigrade, maintaining an evaporating zone within said crystallization zone for subatmospheric removal of water, cooling and concentrating said ammonium perchlorate solution in said evaporating zone to a supersaturated condition by removing water, crystallizing ammonium perchlorate while maintaining said supersaturated condition at a level below that at which spontaneous seed generation occurs by feeding to said supersaturated solution seeding particles of ammonium perchlorate wherein said seeding particles are obtained by grinding ammonium perchlorate crystals to a particle size of 0.01 to 50 microns, and wherein said seeding is at a rate based on the solids, corresponding to about 0.5 to 20 percent by weight of crystalline product removed from the crystallization zone, and removing from said crystallization zone, crystalline ammonium perchlorate product.

7. A continuous process for producing low moisture, high quality ammonium perchlorate crystals suitable for rocket propellant use comprising feeding to a crystallization zone, maintained at a temperature from about 20 degrees centigrade to about 90 degrees centigrade, an aqueous solution containing ammonium perchlorate, maintaining an evaporating zone within said crystallization zone for subatmospheric removal of water, cooling and concentrating said ammonium perchlorate solution in said evaporating zone to a supersaturated condition by removing water, crystallizing ammonium perchlorate while maintaining said supersaturated condition at a level below that at which spontaneous seed generation occurs by feeding to said supersaturated solution seeding particles of ammonium perchlorate wherein said seeding particles are obtained by withdrawing a portion of solution and crystals from the crystallization zone, grinding the crystals in said solution to a particle size of 0.01 to 50 microns and returning the ground particles and solution to the crystallizer zone, wherein said seeding is at a rate proportional to the rate of crystalline product removed from the crystallization zone, crystalline ammonium perchlorate product.

8. A continuous process for producing low moisture, high quality ammonium perchlorate crystals suitable for rocket propellant use comprising feeding to a crystallization zone, maintained at a temperature from about 20 degrees centigrade to about 90 degrees centigrade, an aqueous solution containing about 10 to about 50 percent of ammonium perchlorate by weight at a temperature of about 30 to 110 degrees centigrade, maintaining an evaporating zone within said crystallization zone for subatmospheric removal of water, cooling and concentrating said ammonium perchlorate solution in said evaporating zone to a supersaturated condition by removing water, crystallizing ammonium perchlorate while maintaining said supersaturated condition at a level below that at which spontaneous seed generation occurs by feeding to said supersaturated solution seeding particles of ammonium perchlorate wherein said seeding particles are obtained by withdrawing a portion of solution and crystals from the crystallization zone, grinding the crystals in said solution to a particle size of 0.01 to 50 microns and returning the ground particles and solution to the crystallization zone, wherein said seeding is at a rate based on the solids, corresponding to about 0.5 to 20 percent by weight of crystalline product removed from the crystallization zone, and removing from said crystallization zone, crystalline ammonium perchlorate product.

References Cited

UNITED STATES PATENTS

| 2,347,073 | 4/1944 | Beekhuis | 23—301 |
| 2,739,873 | 3/1956 | Schumacher | 23—85 |
| 2,887,723 | 5/1959 | Hallie | 23—301 |
| 3,218,121 | 11/1965 | Tufts | 23—85 |

WILBUR L. BASCOMB, JR., *Primary Examiner.*

GENE P. HINES, *Assistant Examiner.*

U.S. Cl. X.R.

23—85, 295; 159—45